United States Patent Office 3,103,497
Patented Sept. 10, 1963

3,103,497
BLEND OF VINYLIDENE CYANIDE:VINYL ACETATE COPOLYMER WITH A 4-VINYL PYRIDINE COPOLYMER
John C. McCarty, Elyria, and Floyd D. Stewart, Akron, Ohio, assignors, by mesne assignments, to Celanese Corporation of America, New York, N.Y., a corporation of Delaware
No Drawing. Filed Aug. 15, 1957, Ser. No. 678,455
7 Claims. (Cl. 260—41)

This invention relates to polymeric compositions having unusual fiber-forming properties. More specifically, the invention relates to blends of a homopolymer or copolymer of 4-vinyl pyridine and equimolar polymeric vinylidene cyanide:vinyl acetate compositions capable of being converted readily into dyeable general purpose fibers, filaments, films and other forms of shaped articles and plastic mixtures.

It is well known that polyvinylidene cyanide and various copolymers, terpolymers and interpolymers of vinylidene cyanide and other olefinically unsaturated monomers can be spun into synthetic fibers possessing unusually high strength and other desirable properties. One of the best of these fiber materials is the 50/50 mol percent copolymer of vinylidene cyanide:vinyl acetate which is further described in U.S. Patent No. 2,615,866.

To be of value to the trade, however, any synthetic fiber produced must be readily and successfully dyeable, preferably with the dyes and techniques currently in use in the dyeing art. Like many hydrophobic synthetic fibers and filaments, those made from vinylidene cyanide interpolymers have slick, smooth surfaces and are resistant to penetration by ordinary dyestuffs. Further, these polymeric fibers offer a minimum of sites or molecular groups to which dye molecules may become affixed.

It has been suggested that by copolymerizing monomers which ordinarily produce such undyeable fibers with other monomers containing basic groups, adequate sites for subsequent dye attachment could be provided. As demonstrated in the art, however, vinylidene cyanide monomer homopolymerizes to form a low melting, relatively low molecular weight, resinous polymer when basic groups or water are present even in small amounts. Alternatively, penetration of dyes into these dye-resistant synthetic fibers is sometimes improved by use of a swelling agent or dye carrier in the dye bath. Methyl salicylate, o-phenylphenol, biphenyl, acetophenone, and N,N-diphenyl formamide have been used in this way with some success, but their use leads to higher costs and often requires extra care in handling to avoid the effects of odious and toxic vapors.

An object of this invention is to provide a new vinylidene cyanide:vinyl acetate polymer composition which has the chemical and physical properties of equimolar vinylidene cyanide:vinyl acetate copolymer, and which is completely receptive to wool-type, vat and acetate dyes. By wool-type dyes we mean the acid dyes also known as weak acid dyes and strong acid dyes depending upon whether they contain one or more than one sulfonic acid group. A further object is the provision of vinylidene cyanide:vinyl acetate copolymer compositions from which readily dyeable fibers, yarns, fabrics and the like can be prepared. Other objects will be apparent from the following description.

The objects of this invention are accomplished by blending equimolar vinylidene cyanide:vinyl acetate copolymer, preferably at the spinning stage, with a homopolymer or copolymer of 4-vinyl pyridine to form a polyblend spinning dope which can be spun into general purpose fibers that readily accept commercial dyes.

The equimolar vinylidene cyanide:vinyl acetate copolymer which is the basis of the textiles of this invention is prepared in filament, fiber, fabric or film form according to the teachings of U.S. Patent No. 2,615,866 which are incorporated herein by reference. As produced under the teachings of this patent, however, the vinylidene cyanide:vinyl acetate copolymer filaments are not too readily dyeable because of inherent hydrophobicity and lack of reactive dye sites along the copolymer chain. Some success in dyeing has been experienced in adding certain carriers or swelling agents to the dye baths to promote swelling of the fabric and sorption of the dye, and treating the copolymer with a dilute aqueous amine before dyeing, but these procedures still often fail to produce a satisfactorily dyed commercially usable end product without undue expense.

Introduction of hydrophilic and reactive materials into vinylidene cyanide:vinyl acetate copolymer can be accomplished by placing hydrophilic materials in the copolymer during polymerization to give terpolymers reactive to dyes, or by adding hydrophilic polymers and polymers having reactive groups to the vinylidene cyanide:vinyl acetate fiber spinning dopes to give polyblends containing reactive sites. Great care must be used however, for it is known in the art that vinylidene cyanide monomer tends to homopolymerize in the presence of water or basic monomers. Therefore any extra basic groups must be added after the vinylidene cyanide:vinyl acetate copolymer has been formed, that is, they must be added either in the spinning solutions or by treatment of finished fibers.

The process of this invention is to prepare polymers and copolymers of certain nitrogen-containing, basic compounds which are compatible with the vinylidene cyanide:vinyl acetate copolymer in that while physical properties of the base fiber are not harmed it becomes more reactive to various dyestuffs than the standard copolymer fibers, while production costs are not excessively increased.

It has been found especially advantageous to form a polyblend of equimolar vinylidene cyanide:vinyl acetate copolymer and a homopolymer or copolymer of 4-vinyl pyridine. Poly-4-vinyl pyridine is produced by polymerizing monomeric 4-vinyl pyridine in solution in a nitrogen atmosphere using a peroxide catalyst.

4-vinyl pyridine polymer or copolymer thereof, as will be shown below, does introduce the desired hydrophilicity and basic reactive sites to the vinylidene cyanide:vinyl acetate copolymer to allow satisfactory dyeing. It is surprising that 4-vinyl pyridine is the only vinyl pyridine employable in the practice of this invention. Isomeric 2-vinyl pyridine and alkyl substituted 2- and 5-vinyl pyridines and their copolymers are ineffective to produce the desired dyeability. When copolymers of 4-vinyl pyridine are employed, it is preferred to keep the mol ratio of vinyl pyridine in the copolymer above 60 percent.

Poly-4-vinyl pyridine and copolymers with such monoolefinic monomers as vinyl acetate, acrylonitrile, styrene, and methylmethacrylate may be prepared in solution systems by charging monomers and a free radical catalyst such as benzoyl peroxide to a polymerization bottle or flask containing hexane, heptane, water or a similar solvent and equipped for temperature control, agitation and condensation of reaction vapors. Several hours heating and stirring at 50°–70° C. produces a slightly gummy to granular polymer or copolymer that can be filtered, washed and vacuum dried at 40–50° C.

Another method of preparing poly-4-vinyl pyridines and copolymers thereof is to employ a suspension system wherein monomers, water, sodium alkyl naphthalene sulfonate and benzoyl peroxide are placed in a polymerization container, stirred or shaken till a stable suspension forms, then heated to 50° C. for 10–20 hours under reaction pressure. Usually the polymer or copolymer comes down in the form of relatively hard beads and is easily separated by filtration for the drying step.

Poly-4-vinyl pyridines and copolymers thereof enable one to produce dyeable vinylidene cyanide:vinyl acetate copolymer fibers by polyblending techniques.

Polyblends of the polymers and copolymers of this invention are prepared by incorporating the desired materials into a common spinning solvent such as dimethylformamide, acetonitrile, or acetonitrile-water azeotrope. With the acetonitrile-water solvent system it is desirable to incorporate a small amount of an organic acid such as acetic acid into the dope to avoid filter blocking from deposited polymer. Another very successful solvent for polymer polyblends of equimolar vinylidene cyanide:vinyl acetate and poly-4-vinyl pyridine is a mixture of acetonitrile (90%) and methanol (10%). Polymer polyblend solutions are usually prepared in strengths of about 20 percent by weight with the equimolar vinylidene cyanide:vinyl acetate copolymer comprising about 85 to 97 percent of the polymer present. Gently rolling the mixture for several hours at room temperature usually effects the formation of a homogenous solution, in dimethyl formamide, while for the other solvents mild heating to 40°–50° C. may be required. It is preferred that the percentage of total polymer in the polyblend which is poly-4-vinyl pyridine be between 15 percent and 6 percent with about 7 percent being most preferred. When the 4-vinyl pyridine is present in the form of a copolymer, rather than as a homopolymer, the above percentages still hold and a further limitation is recognized. Styrene and 4-vinyl pyridine, for example, can be copolymerized through the entire molar range 99/1 to 1/99, but it is preferred when dealing with such copolymer systems to keep the 4-vinyl pyridine content at 60 percent or above. Lower proportions of vinyl pyridine are found to give copolymers insoluble in the spinning systems employed. It is to be understood that mixtures of poly-4-vinyl pyridine and one or more 4-vinyl pyridine copolymers can also be used in forming the polyblend solutions of this invention so long as the above limitations on 4-vinyl pyridine content are observed.

The spinning solutions can be wet-spun into fibers by pumping the solution through a spinneret into a bath comprised of water and the solvent employed to form the spinning solution. The polyblend fibers are washed stretched, relaxed, and dried—all steps familiar to those versed in the art. Standard dyeing techniques then suffice to apply the so-called wool dyes, azoic dyes and vat dyes to the fibers.

A simple comparison test was used to evaluate dyeability of the various fibers tested. For each dye used a standardization curve was prepared by making water solutions of the dye of known strength. The transmissivity of each such sample was read in a Lumetron colorimeter and a curve was made by plotting dye concentration in g./100 ml. vs. percent transmission. In all dye tests, exactly 0.5 gram of fiber is dyed in a bath containing exactly 200 mg. of dye. By using the colorimeter, the amount of dye left in the dyebath is easily determined and the amount transferred to the 0.5 gram fiber sample is calculated by difference.

For acid dyes the standard dyeing test employed used 40 percent on weight of fabric (OWF) of Fast Light Red 4BA dyestuff, equal to 200 mg., 10 percent OWF $H_2SO_4$, a 40:1 liquor to fabric ratio and a dye time of one hour at boil. Dyed fabric was washed with distilled water and washings and dye bath were diluted to a known volume. Light transmission determined on this solution led to an easy calculation for amount of dye transferred to the fiber. The various dyes that can be used include acid, metallized acid, and neutral metallized acid dyes, all of which are describable as wool-type dyes, and azoic dyes which also attach well to the polyblend fibers of this invention.

Examples are given below to illustrate, not limit, the scope of this invention. Parts and percentages are given on a weight basis. Intrinsic viscosities (I.V.) were determined in dimethylformamide at 24.2° C. using 0.4 g. polymer per 100 ml. of dimethyl formamide.

EXAMPLE 1

Various homopolymers and copolymers of 4-vinyl pyridine, 2-vinyl pyridine, 2-vinyl-5-ethyl pyridine, and 2-methyl-5-vinyl pyridine were prepared by the solution polymerization technique described above. Water was employed as the solvent and benzoyl peroxide as the catalyst. Monomers, molar ratios, polymerization times, and intrinsic viscosities are set out in Table 1.

*Table 1*

| Monomer | Co-monomer | Molar ratio | Time in hours | I.V. | Designation |
| --- | --- | --- | --- | --- | --- |
| 4-vinyl pyridine | | 100/0 | 18 | 1.19 | A |
| 2-vinyl pyridine | | 100/0 | 7 | | B |
| Do | Styrene | 70/30 | 20 | 0.44 | C |
| 2-vinyl-5-ethyl pyridine | | 100/0 | 24 | 0.37 | D |
| Do | Vinyl acetate | 50/50 | 24 | 0.17 | E |
| 2-methyl-5-vinyl pyridine | Styrene | 70/30 | 20 | 0.75 | F |
| 2-vinyl-5-ethyl pyridine | do | 70/30 | 20 | 0.39 | G |
| 4-vinyl pyridine | Vinyl acetate | 70/30 | 18 | 0.45 | H |
| Do | Acrylonitrile | 40/60 | 3.5 | 1.41 | I |
| Do | do | 70/30 | 12 | 1.11 | J |
| Do | Methyl methacrylate | 40/60 | 4 | 1.24 | K |
| Do | Styrene | 30/70 | 5 | 0.66 | L |
| Do | do | 60/40 | 21 | 0.91 | M |
| Do | do | 65/35 | 16 | 0.86 | N |
| Do | do | 70/30 | 12 | | O |
| Do | Alpha-methyl styrene | 70/30 | 23 | 1.74 | P |
| Do | Vinyl toluene | 70/30 | 7 | 0.64 | Q |

Polyblends of equimolar vinylidene cyanide:vinyl acetate copolymer with all polymers A through Q, in various proportions such 90/10, 88/12, 85/15, 97/3, were prepared by rolling the solids overnight in dimethylformamide, forming smooth, homogeneous spinning dopes of about 20% total solids. These dopes were singly extruded through a multihole spinneret with the spun polyblend fibers being washed, stretched, dried and relaxed according to steps well known in the art.

The polyblend fibers were bleached in a 10% (OWF) sodium chlorite/oxalic acid (50/50) bleach bath at a bath liquor to fabric ratio of 40:1 on weight of fabric (OWF). Next they were rinsed in warm water, agitated for 15 minutes in a warm one percent sodium bisulfite solution and finally scoured in 0.1 percent sodium-N-methyl oleoyl taurate solution at the boil for 30 minutes.

Finally, half-gram samples of the polyblend fibers were dyed one hour at the boil in dye baths containing 40 percent OWF dyestuff, 10 percent OWF $H_2SO_4$, and a liquor to fiber ratio of 40:1. After washing and dilution, the amounts of dye retained on the fiber were determined by comparison of Lumetron colorimeter readings with previously prepared standard light transmission curves established for the particular dyestuff employed. The polyblend, ratio of components, dyestuff and remarks for each sample prepared are listed in Table 2. Polyblend A refers to a polyblend of equimolar vinylidene cyanide:vinyl acetate copolymer with the A polymer of Table 1, polyblend B, a polyblend with the B polymer of Table 1, etc. Subscript numbers, i.e. $A_1$, indicate a change in the weight ratio of the polyblend components or a change in the dyestuff used. Any value over 50 mg. dye absorbed per 0.5 gram of fiber indicates good dyeing. Some samples were divided and part exposed to steaming for 5 mintues at 15 p.s.i.g., equal to 212° F., before dyeing, a treatment which tends to make vinylidene cyanide:vinyl acetate copolymer fibers even more dye-resistant than they usually are.

Table 2

| Polyblend | Ratio of fiber copolymer/ blending polymer or copolymer | Dyestuff | Remarks |
|---|---|---|---|
| A | 90/10 | Orange 11 | Good color. Dyebath 73% exhausted. 147 mg. dye on 0.5 g. fiber. |
| A₁ | 90/10 | Fast Light Red 4BA. | 142 mg. dye on 0.5 g. fiber. 105 mg. after steaming 5' at 15 p.s.i.g. 100% dye penetration. |
| A₂ | 92/8 | ___do___ | 68 mg. dye on 0.5 g. fiber. 25 mg. after steam. 100% dye penetration. |
| A₃ | 93/7 | Orange 11 | 113 mg. dye on 0.5 g. fiber. |
| A₄ | 95/5 | ___do___ | 9 mg. dye on 0.5 g. fiber. |
| B | 90/10 | | Polymers incompatible, could not spin. |
| C | 90/10 | Vitrolan GRE | Poor dyeing. |
| C₁ | 90/10 | Palatine Blue | Do. |
| D | 90/10 | Fast Light Red 4BA. | 30 mg. dye on 0.5 g. fiber. |
| E | 90/10 | | Insoluble, could not spin. |
| E₁ | 88/12 | Fast Light Red 4BA. | 23 mg. dye on 0.5 g. fiber. |
| F | 90/10 | Vitrolan GRE | Fair dye shade. |
| F₁ | 90/10 | Palatine Blue | Fair dyeing. |
| G | 90/10 | Vitrolan GRE | Very poor dye shade. |
| G₁ | 90/10 | Palatine Blue | Very poor dyeing. |
| H | 90/10 | Fast Light Red 4BA. | 167 mg. dye on 0.5 g. fiber. 63 mg. after steaming. |
| H₁ | 88/12 | Crocein Scarlet N Extra. | 100 mg. dye left on 0.5 g. fiber. |
| I | 88/12 | ___do___ | 28 mg. dye on 0.5 g. fiber. |
| J | 90/10 | Fast Light Red 4BA. | 137 mg. dye on 0.5 g. fiber. |
| K | 90/10 | ___do___ | 94 mg. on 0.5 g. fiber, 30 mg. after steaming. |
| L | 90/10 | | Polymers incompatible. Could not spin. |
| M | 90/10 | Fast Light Red 4BA. | 12 to 18 mg. dye on 0.5 g. fiber. |
| N | 90/10 | ___do___ | 20 to 24 mg. dye on 0.5 g. fiber. |
| O | 90/10 | ___do___ | 100 to 150 mg. dye on 0.5 g. fiber. |
| O₁ | 90/10 | Irgalon Brilliant Green. | Good light green shade. |
| P | 90/10 | Vitrolan GRE | Good dyeing. |
| P₁ | 90/10 | Palatine Blue | Do. |
| Q | 90/10 | Palatine Blue | Very good dye shade and penetration. |

Table 2 shows that improvement of dyeability of equimolar vinylidene cyanide:vinyl acetate materials by the method of this invention is unique with 4-vinyl pyridine. Polyblend A₄, containing only 5% 4-vinyl pyridine shows the great fall off in dyeability when less than the preferred 6–15% vinyl pyridine is present. Polyblends I and J for acrylonitrile copolymers and L, M, N and O for styrene copolymers show that for a given 4-vinyl pyridine copolymer there is a sharp jump from good dyeing to excellent dyeing when the 4-vinyl pyridine component is present in its copolymer in the molar ratio of at least 70%.

EXAMPLE 2

To determine relative dyeability of fibers after various treatments, several polyblend fibers were prepared from equimolar vinylidene cyanide:vinyl acetate and a homopolymer of 4-vinyl pyridine. One group of each set of fibers was dyed "as spun." Another group of each set was subjected to an elongating draw of 200% after spinning, and then dyed. A third group of each set of fibers was bleached in a 10% OWF sodium chlorite/oxalic acid (50/50) bleach solution before dyeing. Polyblend ratios, fiber state, and mg. of dye absorbed per 0.5 gram of fiber are set forth in Table 3. Dyeings were performed at boil for one hour with a 40% concentration of Fast Light Red 4BA dyestuff.

Table 3

| Vinylidene cyanide: vinyl acetate/4-vinyl pyridine ratio | State of fiber and mg. dye absorbed per 0.5 g. fiber | | |
|---|---|---|---|
| | As spun | Drawn | Bleached |
| 92/8 | 102 | 60 | 40 |
| 91/9 | 142 | 112 | 87 |
| 90/10 | 151 | 145 | 132 |

With proper selection of the correct amount of 4-vinyl pyridine, dyeability of equimolar vinylidene cyanide:vinyl acetate copolymer fiber is tremendously improved even though the fibers are subjected to various operations which normally tend to decrease the naturally low dyeability of these fibers.

EXAMPLE 3

To determine the effect of dyeing time on the amount of dye absorbed a series of polyblend fibers containing equimolar vinylidene cyanide:vinyl acetate copolymer and poly-4-vinyl pyridine was run. Polyblend ratios, dye times and mg. dye absorbed per 0.5 g. fiber are set forth in Table 4. Dyeings were conducted in 40% Fast Light Red 4BA dye baths at boil for the indicated times to give deep true shades.

Table 4

| Vinylidene cyanide: vinyl acetate/4-vinyl pyridine ratio | Dyeing time and mg. dye absorbed per 0.5 g. fiber | | |
|---|---|---|---|
| | 60 min. | 90 min. | 120 min. |
| 90/10 | 150 | 151 | 156 |
| 91/9 | 134 | 142 | 142 |
| 92/8 | 72 | 80 | 87 |

These data show that a dye time of one hour at boil is just as effective as a longer period in effecting dye pick-up by these polyblend fibers.

EXAMPLE 4

A 70/30 mol ratio 4-vinyl pyridine:styrene copolymer was prepared and polyblended with equimolar vinylidene cyanide:vinyl acetate copolymer in the ratio 10:90 in acetonitrile-water azeotrope solvent. The polyblend solution was spun, drawn, scoured and dried; then subjected to azoic dyeing as follows: A 0.5 gram sample of fabric was placed in a dye bath containing 5% OWF. Acetamine Diazo Black RB Conc. dyestuff, 1% OWF of an anionic wetting agent, Ultrawet 60L (an alkyl benzene sulfonate of an organic salt), and a liquor to fabric ratio of 40:1. After one hour at the boil, the fabric was rinsed in cold water and placed cold in a developer bath containing 4% beta-oxynaphthoic acid by weight, where it was boiled for one hour, then again rinsed in cold water. Next the fabric was placed in a bath containing 5% sodium nitrate and 10% sulfuric acid by weight, heated to 150° F. for 30 minutes and rinsed. A full shade of black was produced on the fabric sample. A control sample of equimolar vinylidene cyanide:vinyl acetate was dyed to a non-uniform gray-black shade.

A second 0.5 gram sample of the polyblend fabric was placed in a bath containing 5% Fast Red Base GL dyestuff OWF and 5% beta-oxynaphthoic acid (developer) OWF, 1% OWF of an anionic wetting agent (Ultrawet 60L) and a liquor to fabric ratio of 40:1. After one hour at boil, the fabric was rinsed in cold water, then heated 30 minutes at 160° F. in a bath containing 5% sodium nitrate and 10% sulfuric acid by weight. After a final rinse the fabric was dried and it then displayed a full shade of brilliant red. A control sample of equimolar vinylidene cyanide:vinyl acetate fabric dyed to a pale red shade.

Softening points, tensiles and other physical properties of the various polyblend fibers are so slightly different from the same properties of equimolar vinylidene cyanide:vinyl acetate copolymer that they can be used in place of the equimolar copolymer fibers with the added feature of ready dyeability.

It is intended that the scope of this invention be limited only by the following claims.

We claim:

1. A new composition of matter comprising a substantially uniform blend of 85 to 94 percent by weight equimolar vinylidene cyanide:vinyl acetate copolymer with 15 to 6 percent by weight of poly-4-vinyl pyridine.

2. A new composition of matter comprising 85 to 91 percent by weight equimolar vinylidene cyanide:vinyl acetate copolymer with 15 to 9 percent by weight of a polymer made from a monomeric mixture containing at least 60 mol percent of 4-vinyl pyridine and from 0 to 40 mol percent of a different monoolefinic monomer copolymerizable with said 4-vinyl pyridine and selected from the class consisting of styrene, alpha-methyl styrene, acrylonitrile, vinyl toluene, vinyl acetate and methyl methacrylate.

3. A new composition of matter comprising 85 to 91 percent by weight equimolar vinylidene cyanide:vinyl acetate copolymer with 15 to 9 percent by weight of 4-vinyl pyridine:styrene copolymer wherein the vinyl pyridine is present in an amount equal to at least 70 mol percent.

4. A new composition of matter comprising 85 to 91 percent by weight equimolar vinylidene cyanide:vinyl acetate copolymer with 15 to 9 percent by weight of 4-vinyl pyridine:acrylonitrile copolymer wherein the vinyl pyridine is present in an amount equal to at least 70 mol percent.

5. A method of forming a dyed plastic mixture comprising blending 85 to 94 percent by weight of an equimolar vinylidene cyanide:vinyl acetate copolymer with from 15 to 6 percent by weight of poly-4-vinyl pyridine and treating with a wool-type dye.

6. A method of forming a dyed plastic mixture comprising blending 85 to 91 percent by weight equimolar vinylidene cyanide:vinyl acetate copolymer with 15 to 9 percent by weight of a polymer made from a monomeric mixture containing at least 60 mol percent of 4-vinyl pyridine and from 0 to 40 mol percent of a different monoolefinic monomer copolymerizable with said 4-vinyl pyridine and selected from the class consisting of styrene, alpha-methyl styrene, acrylonitrile, vinyl toluene, vinyl acetate and methyl methacrylate, and treating with an acid dye.

7. A method of forming a dyed plastic mixture comprising blending 85 to 91 percent by weight equimolar vinylidene cyanide:vinyl acetate copolymer with from 15 to 9 percent by weight of 4-vinyl pyridine:styrene copolymer wherein the vinyl pyridine is present in an amount equal to at least 70 mol percent and treating with a wool-type dye.

References Cited in the file of this patent

UNITED STATES PATENTS

| | | |
|---|---|---|
| 2,527,863 | Webb | Oct. 31, 1950 |
| 2,615,866 | Gilbert et al. | Oct. 28, 1952 |
| 2,688,008 | Chaney et al. | Aug. 31, 1954 |

FOREIGN PATENTS

| | | |
|---|---|---|
| 849,126 | France | Aug. 7, 1939 |
| 725,569 | Great Britain | Mar. 9, 1955 |